(12) United States Patent
Boltan et al.

(10) Patent No.: US 7,337,576 B2
(45) Date of Patent: Mar. 4, 2008

(54) METHODS AND DEVICES OF THE NET APPARATUS, THE FISHING ROD AND THE SPINNING MECHANISM COMBINATION

(76) Inventors: Zinaida Boltan, 32250 Cannon Rd., Solon, OH (US) 44139; Tanya Andrianov, 32573 Haverhill Dr., Solon, OH (US) 44139; Yakov John Donin, 100 Richmond Rd. Apt 536, Euclid, OH (US) 44143

( * ) Notice: Subject to any disclaimer, the term of this patent is extended or adjusted under 35 U.S.C. 154(b) by 148 days.

(21) Appl. No.: 10/770,031

(22) Filed: Feb. 2, 2004

(65) Prior Publication Data

US 2005/0005497 A1 Jan. 13, 2005

Related U.S. Application Data

(60) Provisional application No. 60/447,234, filed on Feb. 12, 2003.

(51) Int. Cl.
*A01K 97/14* (2006.01)
(52) U.S. Cl. .................................. 43/5; 43/7
(58) Field of Classification Search ............... 43/5, 43/7, 17.2
See application file for complete search history.

(56) References Cited

U.S. PATENT DOCUMENTS

| | | | | |
|---|---|---|---|---|
| 1,797,251 A | * | 3/1931 | Frank | 43/5 |
| 2,626,477 A | * | 1/1953 | Richardson | 43/5 |
| 2,641,078 A | * | 6/1953 | Gearien | 43/5 |
| 3,363,355 A | * | 1/1968 | Kellner | 43/5 |
| 3,531,887 A | * | 10/1970 | Bortle | 43/17.2 |
| 3,872,616 A | * | 3/1975 | Poland | 43/5 |
| 3,911,608 A | * | 10/1975 | Holling | 43/5 |
| 4,292,753 A | * | 10/1981 | Yesuratnam | 43/5 |
| 5,237,768 A | * | 8/1993 | Kiekhafer et al. | 43/4.5 |

\* cited by examiner

*Primary Examiner*—Kurt Rowan
(74) *Attorney, Agent, or Firm*—Roetzel & Andress; James C. Scott

(57) ABSTRACT

A fishing rod/net-lasso(s) apparatus combination used as a single product. An angler can fish, net or lasso a caught fish and lift it from any place for fishing, in the summer, winter, or any other season. It is comprised of: a fishing rod with fishing devices; a net-lasso(s) or other device, every net having attached to it a heavy weight; an extra line that connects, on one side, to a soft net or lasso(s) and on the other side to an extra spinning mechanism or another extra line keeper on a fishing rod; a net-lasso together with its keeper/holder, that has a track inside it, the track is slide-joined to a fishing rod and can slide over and around a fishing rod, a fishing line, a kill-devil, a bobber or other fishing line device to the mouth of a caught fish. Then only the net or lasso(s) slides over the caught fish, from its head to tail, netting or lassoing the caught fish, because the fish flippers, gills and flanks are entangled in the netting and the fish is held inside the net or lasso(s) when angler pulls the extra line back.

7 Claims, 9 Drawing Sheets

METHODS AND DEVICES OF THE NET APPARATUS, THE FISHING ROD AND THE SPINNING MECHANISM COMBINATION

CROSS-REFERENCE TO RELATED APPLICATION (Not Applicable)

STATEMENT REGARDING FEDERALLY SPONSORED RESEARCH OR DEVELOPMENT (Not Applicable)

REFERENCE TO A MICROFICHE APPENDIX (Not Applicable)

BACKGROUND OF THE INVENTION

1. Statement of the Field of Endeavor

United States Patent Class 43

The present invention relates to new methods and devices for a fishing rod/net-lasso device combination that is suitable for the use of anglers in various fishing settings in the summer, winter, or any other season. The present invention relates to the combination of any fishing rod and a net or lasso apparatus as one product. A net-lasso apparatus helps the angler to catch fish, netting or lassoing and lifting it in any place, and at any height from the water, for example by one fishing on a bridge, ship or other location.

2. Description of the Prior Art

Fishing nets are widely utilized as auxiliary equipment by anglers, fishermen and sportsmen in order to capture and land a fish caught on a hook. Fishing nets are particularly useful for wading fishermen and highly desirable for sportsmen fishing from a bank or a boat. Many times the problem for a fisherman is to produce an operable fishing net while suddenly encountering a fish and having a simultaneous need to reel in the fish and apply tension to a fishing line. This creates an awkward and cumbersome situation for the sportsman and may cause an adverse effect on the outcome of the situation. While holding a pole and line that is hooked to a fish, a fisherman is relegated to having no more than one hand available for operation of the fishing net.

Historically, nets suited for one hand operation have been available as an elongated rigid handle at one end a permanently affixed loop frame holding a net on the other. However, such a cumbersome apparatus having the frame mounting the net affixed to a permanent extension from the handle is inconvenient because it is difficult to transport and use by the fisherman due to considerable length and awkward nature of the apparatus. Furthermore, the exposed net is prone to snag and catch in the natural obstacles associated with boating, wading, and fishing.

Many fishing nets have been designed before equipped handles and condensed nets. For example, U.S. Pat. No. 3,512,291 describes a landing net wherein the net and its frame can be collapsed. U.S. Pat. No. 3,815,272 describes a fish net that can be collapsed and stored in the net handle through cumbersome manipulation of both the net and frame. U.S. Pat. No. 4,050,177 describes a fish net and frame that is collapsible and storable in the handle by a combination of telescoping and folding the frame and net. U.S. Pat. No. 4,138,790 describes a fish net with a frame and a handle wherein the fish net and frame collapse and pivot into a compact assembly. U.S. Pat. No. 4,207,700 describes a fish net, frame, and handle that can be telescoped and collapsed into the handle, but is not easily transformed from the collapsed state to the operational position. U.S. Pat. No. 4,870,773 describes a fish net, frame, and handle that can be collapsed by folding and un-telescoping of the frame, but does not provide a cover for the stored net. U.S. Pat. No. 3,167,878 describes a fish net containing arms that provide a curvature forming a net frame which can be collapsed into the handle by manually compressing the arms. U.S. Pat. No. 1,169,311 describes a fish net, a three-section frame, and handle that can be collapsed and telescoped into the handle, but requires the time consuming assembly of several frame sections to make the fish net operable.

Although these patents disclose apparatuses containing handles and nets designed to be condensed, the prior art fails to provide a readily collapsible fish net assembly that may be rapidly deployed using one-hand to manipulate the device. The present invention provides a new and useful apparatus that addresses the above problems and other problems as well.

SUMMARY OF THE INVENTION

A fishing rod/net-lasso apparatus combination comprising of: a fishing rod with fishing devices; a net, lasso(s) or other device, that can entangle fish, with a heavy weight attached to each; an extra line, that connects, on one side, to soft net or lasso(s) and on the other side to an extra spinning mechanism or another extra line keeper on a fishing rod; a net-lasso together with its keeper that has a track inside it, slide-joined to a fishing rod and that can slide over and around a fishing rod, a fishing line, a kill-devil, a bobber or other fishing line device to the mouth of a caught fish, and then free from a keeper, net or lasso(s) slides over the caught fish, from moth to tail, netting or lassoing the caught fish, because fish flippers, gills and flanks are entangled in the netting and hold the fish inside the net or lasso(s), when the angler pulls the line back.

Every device of a net-lasso apparatus can be connected to a fishing rod, by the angler, in any place and in any fishing situation, herewith the fishing line must always be free and can slide on the fishing rod. A net or lasso apparatus will slide down easily along every fishing rod with a fishing line tracks, when the angler turns the fishing rod on 180 degrees along the fishing rod's rotational axis and points a fishing rod downwards.

Still further embodiments of the present invention will become apparent to those ordinarily skilled in the art upon a reading and understanding of the drawings and a detailed description of the illustrated embodiments.

BRIEF DESCRIPTION OF THE DRAWINGS

In the accompanying drawings which are incorporated in and constitute a part of the specification, embodiments of the inventions are illustrated, which, together with a general description of the invention given above, and the detailed description given below, serve to demonstrate principles of this invention.

FIGS. 1 to 5 show, for example, the operation of the present invention fishing rod/net-lasso apparatus combination.

FIG. 1A depicts the tubing net to fish-net apparatus.

FIG. 1B depicts the fish-net apparatus joined or slide-joined to the fishing rod as one product.

FIG. 1C depicts the telescopic fishing rod-net apparatus combination in folding position.

FIG. 1D depicts the telescopic fishing rod-net apparatus combination in the fishing position.

FIG. 1E depicts the telescopic fishing rod-net apparatus combination with a caught fish.

FIG. 1F depicts the telescopic fishing rod and fish-net apparatus that slides along the fishing line to the caught fish.

FIG. 1G depicts the telescopic fishing rod-net combination in operation to net a caught fish.

FIG. 1H depicts telescopic fishing rod-net apparatus combination in the process of netting the fish.

FIG. 2 depicts the skeleton of a net or lasso keeper.

FIG. 3 depicts the fishing lasso apparatus with two lasso(s).

FIG. 4 depicts how a fishing lasso apparatus operates to lasso a fish.

FIG. 5A shows a fishing lasso apparatus and a fishing rod as one product in operating in a catch fishing situation.

FIG. 5B shows the process of how to start and slide the fishing lasso apparatus over the fishing rod to catch the fish.

FIG. 5C shows fishing lasso apparatus that slides over fishing rod line to the caught fish.

FIG. 5D shows the fishing lasso apparatus that slides over the kill-devil and stops and covers the fish's head.

FIG. 5E shows how the fishing lasso apparatus lassos the fish.

Figure 1A:
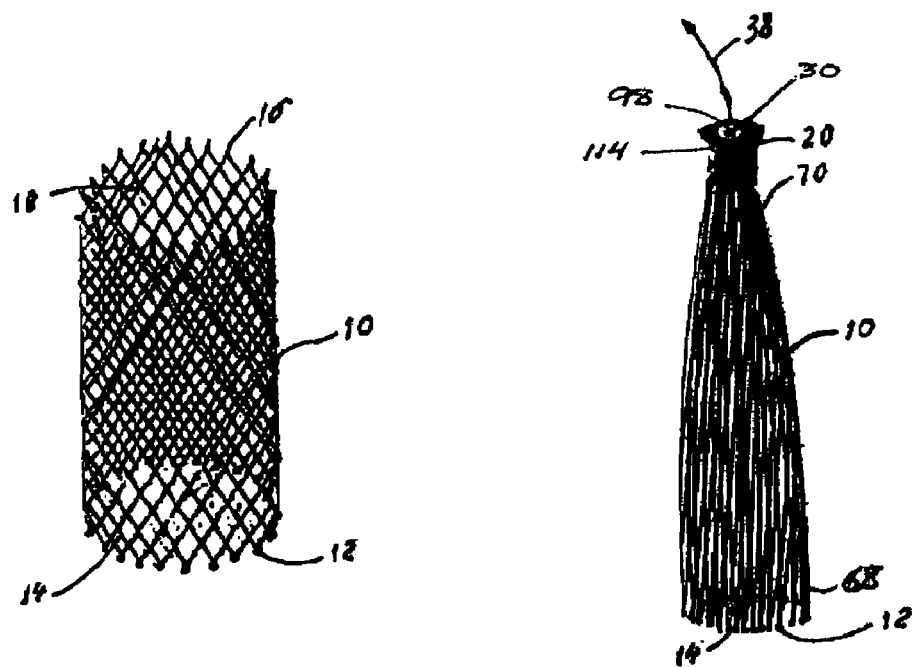
FIGS. 1A to 1H depict embodiments according to the present invention of a fish-net, net-keeper, and a telescopic spinning fishing rod combination as one product with a fishing line inside the telescopic tube.
Figure 1B:
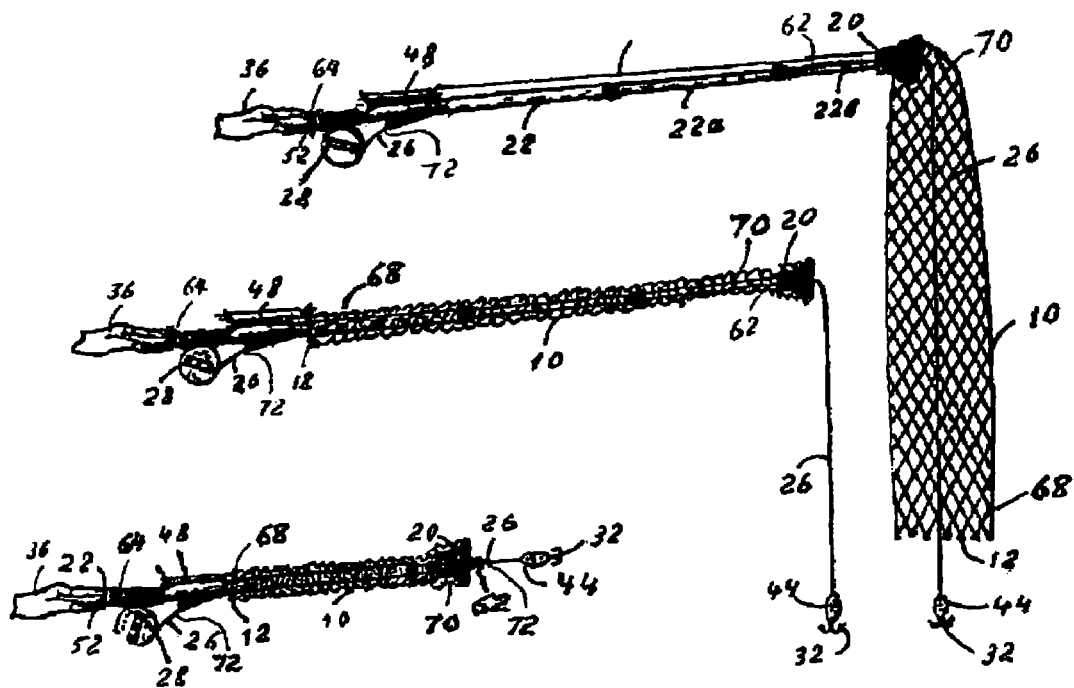
Figure 1C:
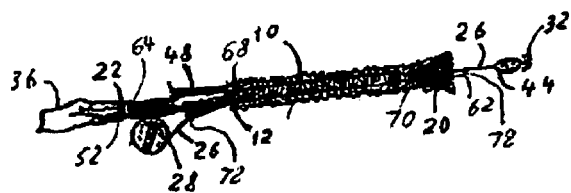
Figure 1D:
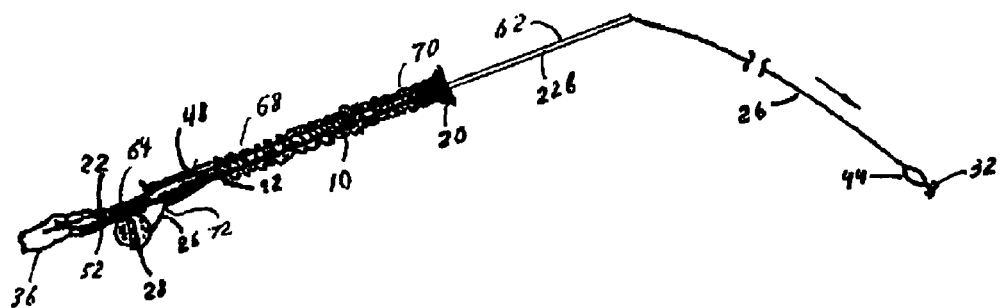
Figure 1E:
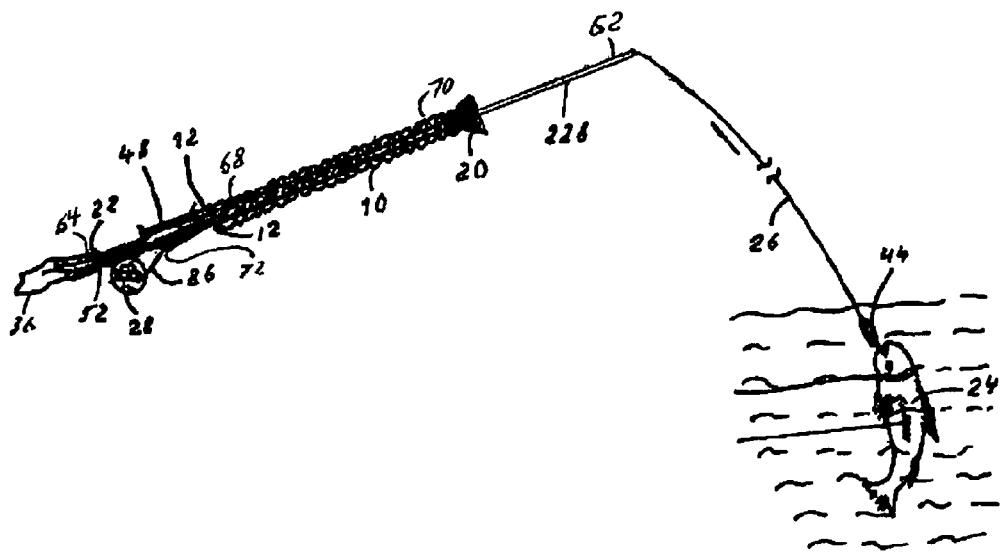
Figure 1F:
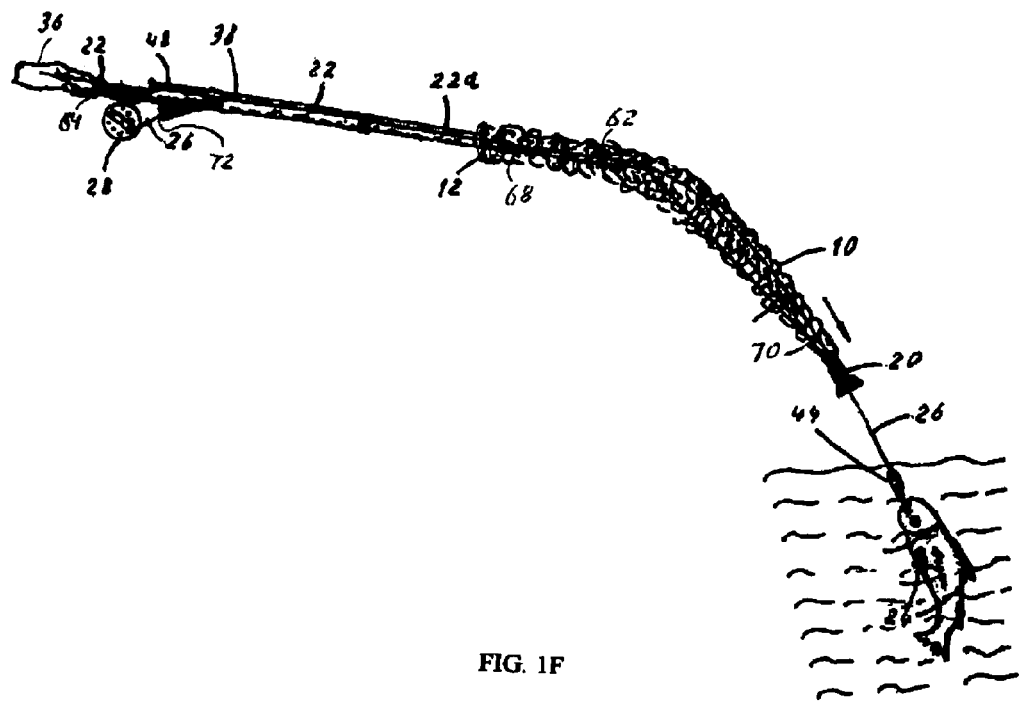
Figure 1G:
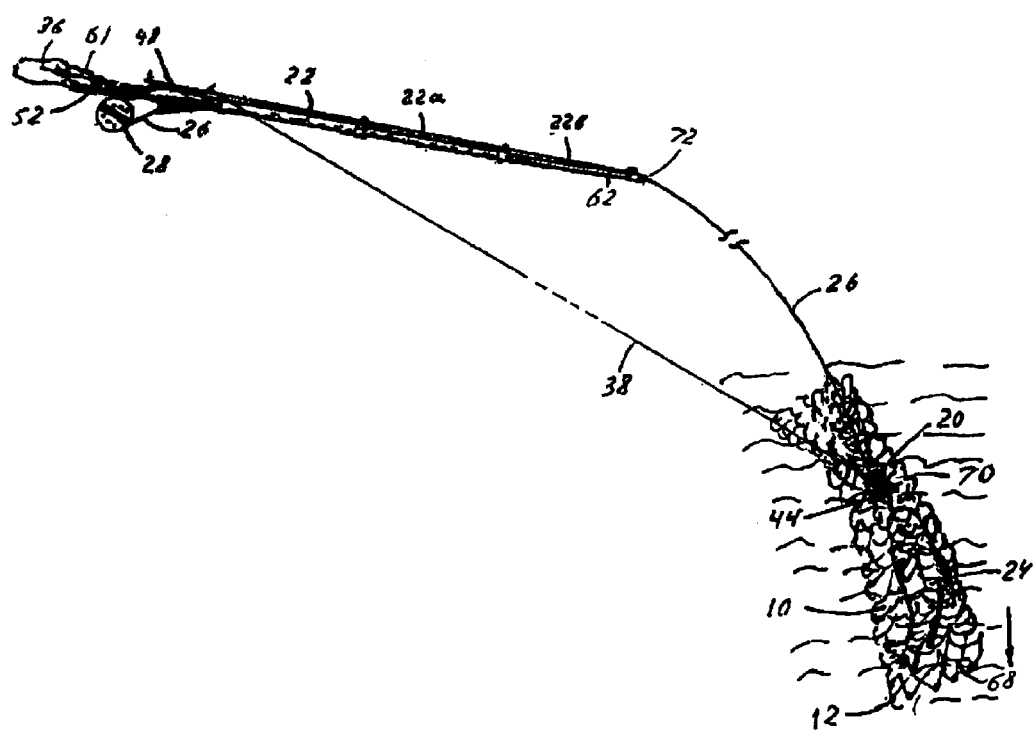
Figure 1H:
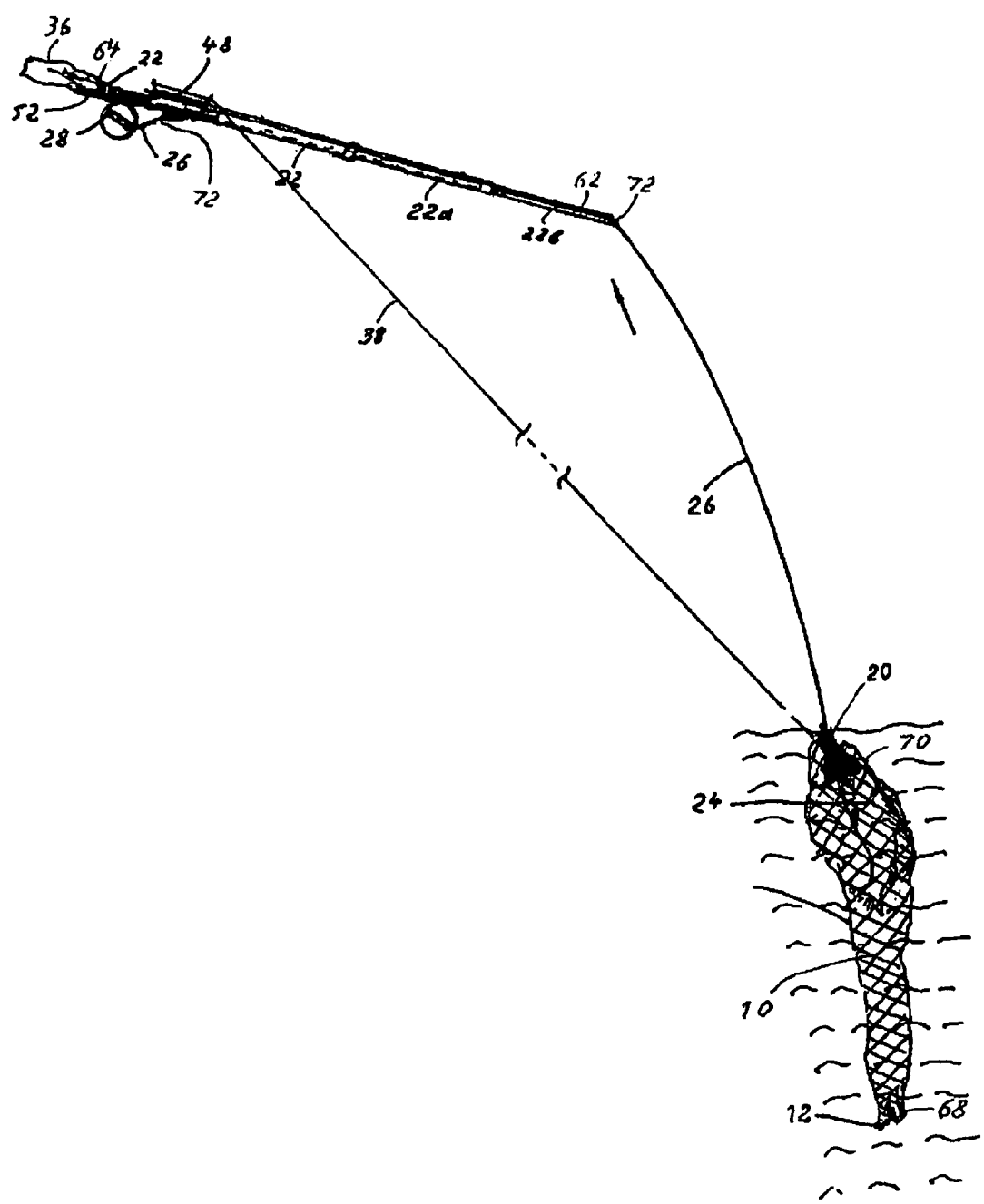

REFERENCE NUMERALS IN DRAWINGS 10 the tubing net
12 the small heavy weight
14 the fish net opening
16 the net clip or connector
18 the second net opening
20 the net keeper
22 the telescopic fishing rod
24 the caught fish
26 the fishing line
28 the fishing line spinning
30 the net-keeper center
32 the fishing hook
34 the net keeper
36 the angler hand
38 the extra line
40 the net-lasso combination keeper
42 the spinning mechanism
44 the kill-devil
46 the bobber
48. the keeper of extra line
50. the lassos
50a. the first lasso
50b. the second lasso
52. the handle of fishing rod
54. the lasso keeper
56. the lasso heavy weight
58. the lasso stop button
60. the fishing line track

DETAILED DESCRIPTION OF THE ILLUSTRATED EMBODIMENTS

With reference to the drawings, an embodiment of the fishing net is illustrated that is constructed in accordance with the present invention.

A fishing rod/net apparatus combination shown in FIG. 1A to FIG. 1H is comprised of a tubing, telescopic, folding, or other fishing rod 22 with a fishing line 26, that slides inside it 22, from a spinning mechanism 42, and comprising a soft tubing net 10 with some small weight 12 around one opening 14, and some connectors 16 around second opening 18 that join the net 10 to a net-keeper 34, with a center hole-track 30 that joined or slide-joined, over and around, to the fishing rod 22 and to the fishing line 26. A net 10 slides, from a heavy weight 12 over the caught fish 24 from fish head to tail, and that attaches to the fish flippers, gills and flanks, entangling the fish in the netting and preventing escape. The net 10 can be disconnected as needed and the fish can be taken out.

A net-keeper 34 has a form or construction that prevents a net 10 from any connection with a fishing hook 32, kill-devil 44, bobber 46 or other fishing line 26 devices, when a net 10 with weight 12 slides over them and over the caught fish 24 and nets it. Construction of a kill-devil 44, a bobber 46 or other fishing line 26 devices can be a net-keeper 34 at same time that has a trigger that can be deployed automatically by the caught fish 24, or that can be deployed freely by an angler's hands at any time the angler desires in order to net the fish 24. The net-keeper 20 can be joined to the extra line 38 that can be slide joined to a main fishing line 26 and to the extra spinning mechanism or another extra line keeper 48 on the fishing rod 22.

Figure 2:
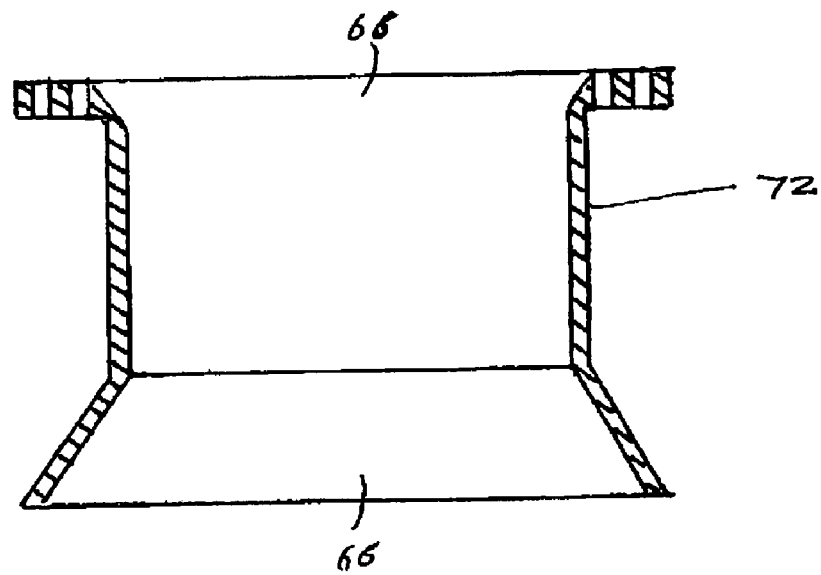
Figure 2:
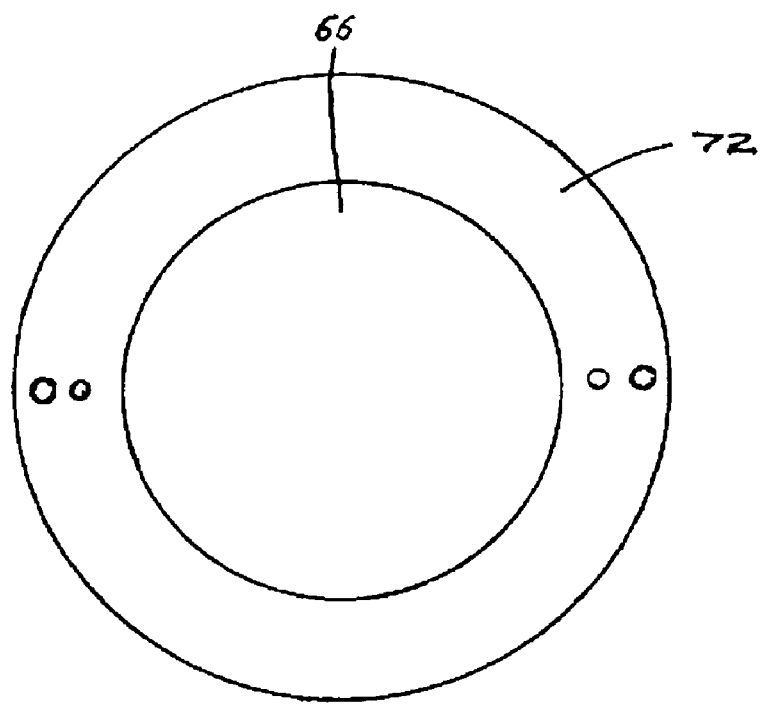

FIG. 2 shows the skeleton of the net-lasso apparatus keeper 40.

Figure 3:
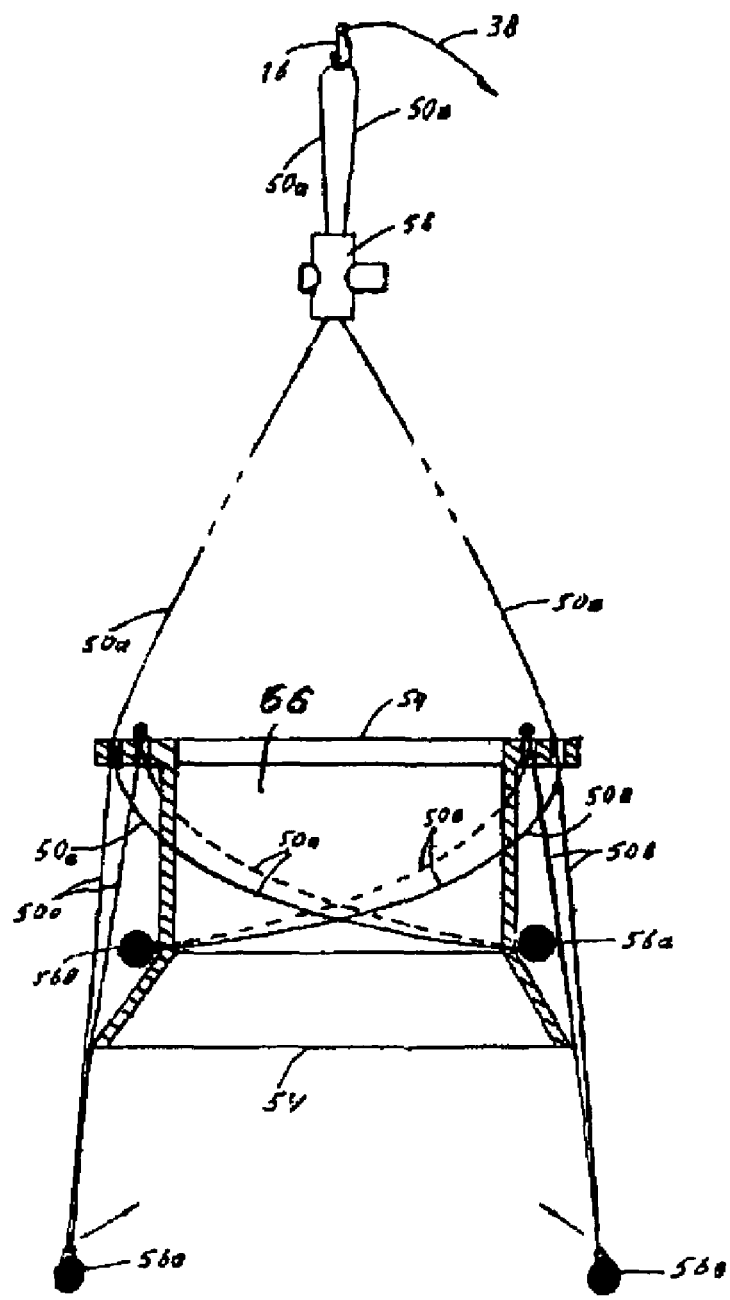

FIG. 3 shows the fishing lasso apparatus comprised of two lassos 50a and 50b with a heavy weight 56a and 56b. Lassos end joined to the lasso-keeper 54; the lasso stop button 58 can change the length of the loop in the lassos 50. In start position loops 50a and 50b are attached to lassos keeper 54.

Figure 4:
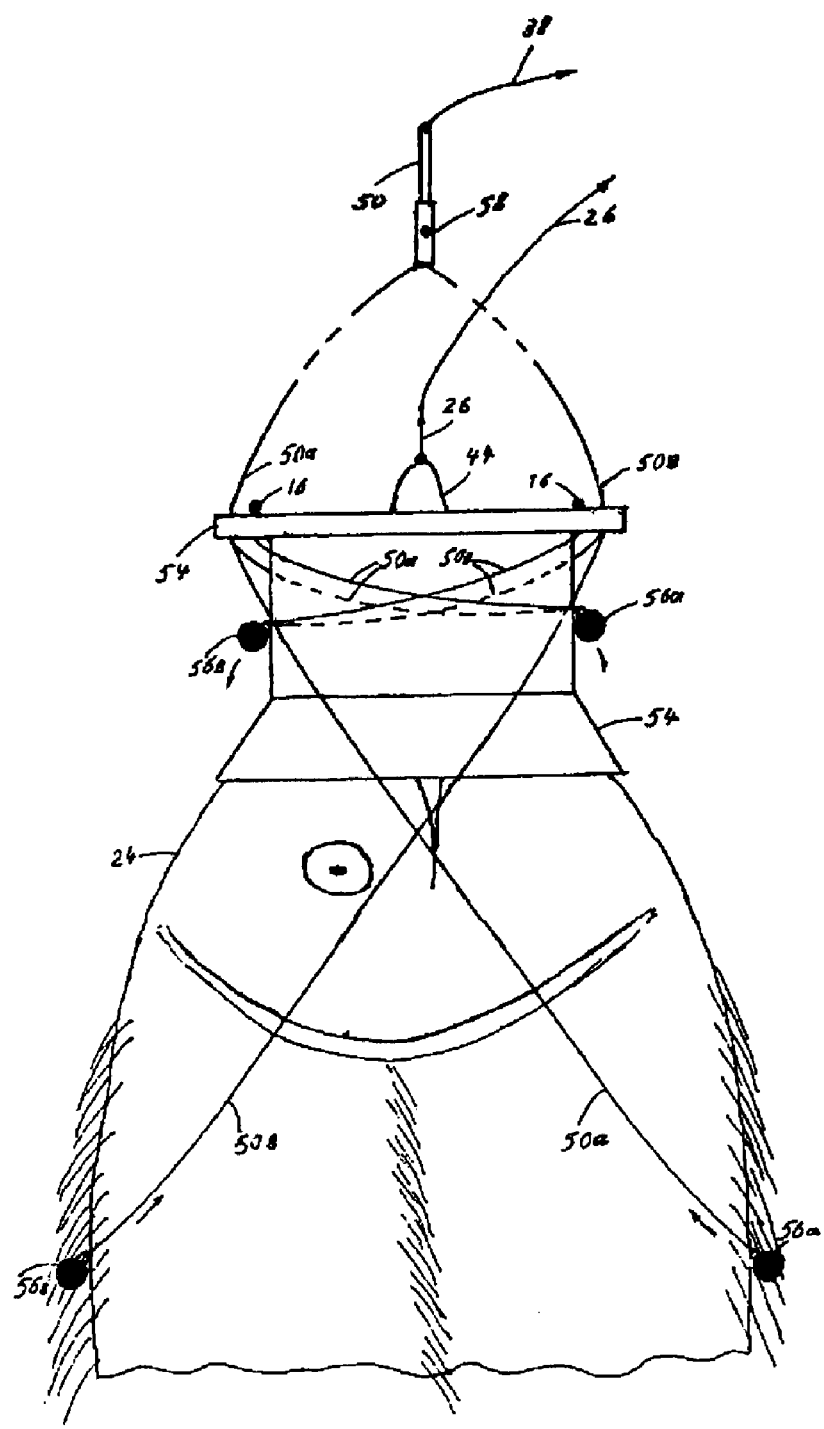
Figure 5A:
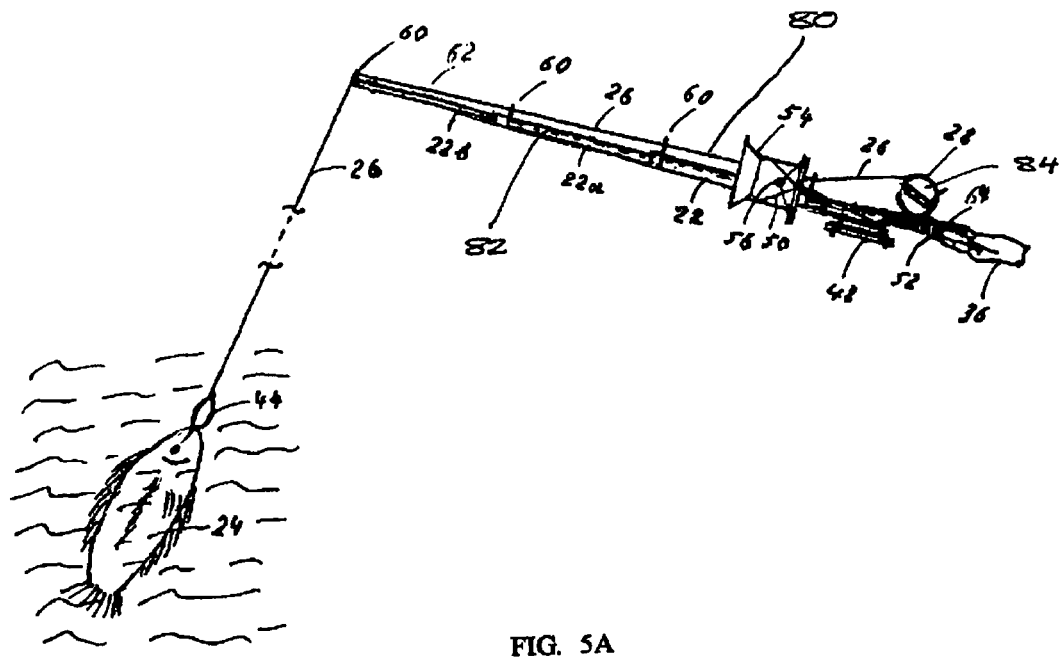
FIG. 5A to FIG. 5E shows the fishing lasso apparatus and fishing rod as one product operating in any fishing situation.
Figure 5B:
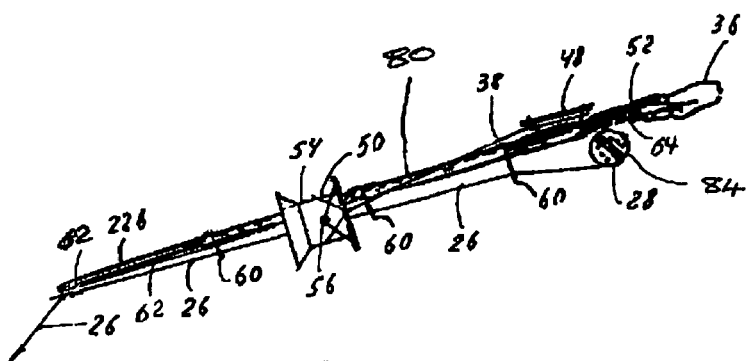
Figure 5C:
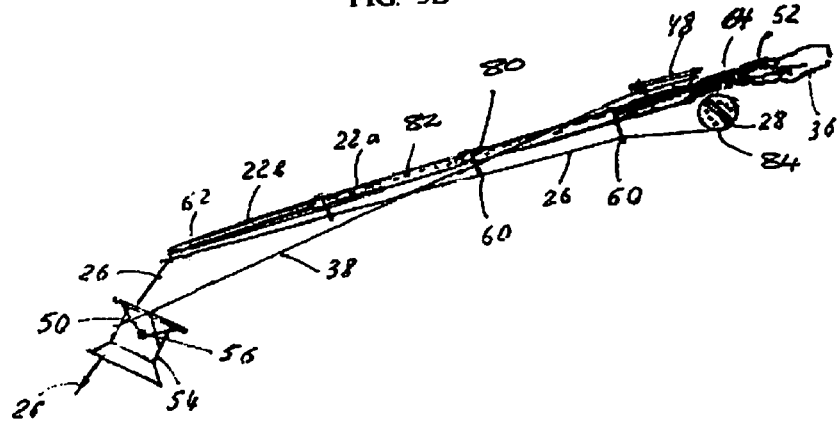
Figure 5D:
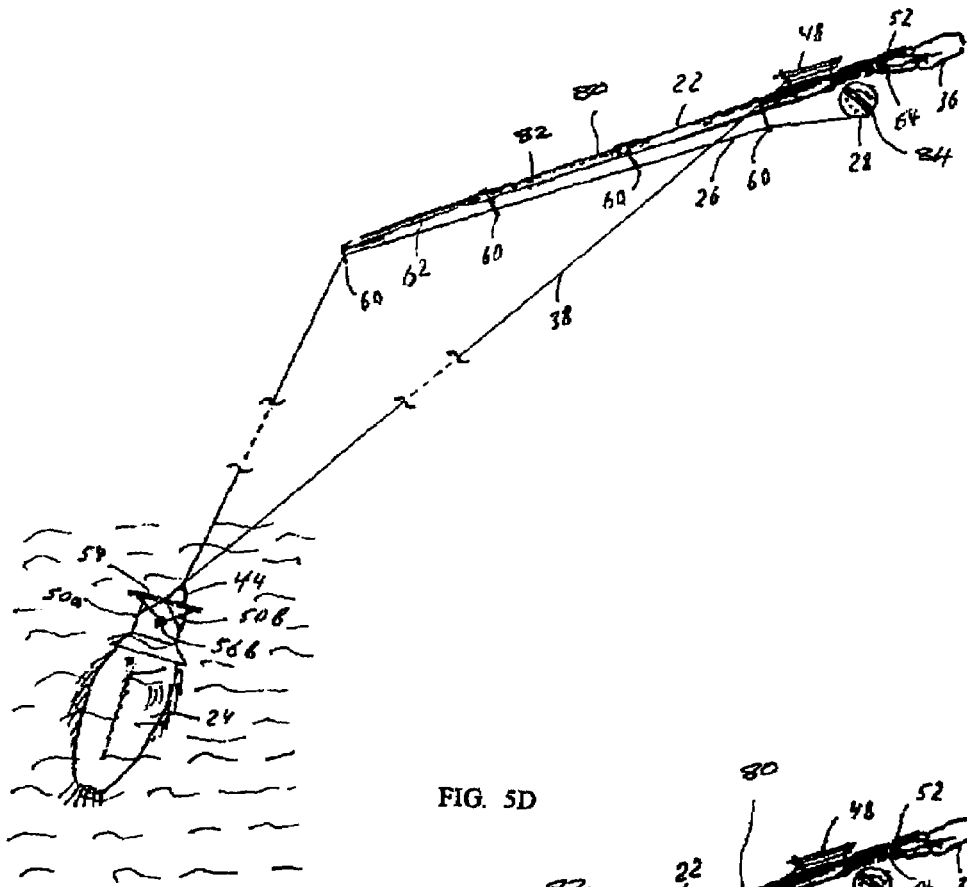
Figure 5E:
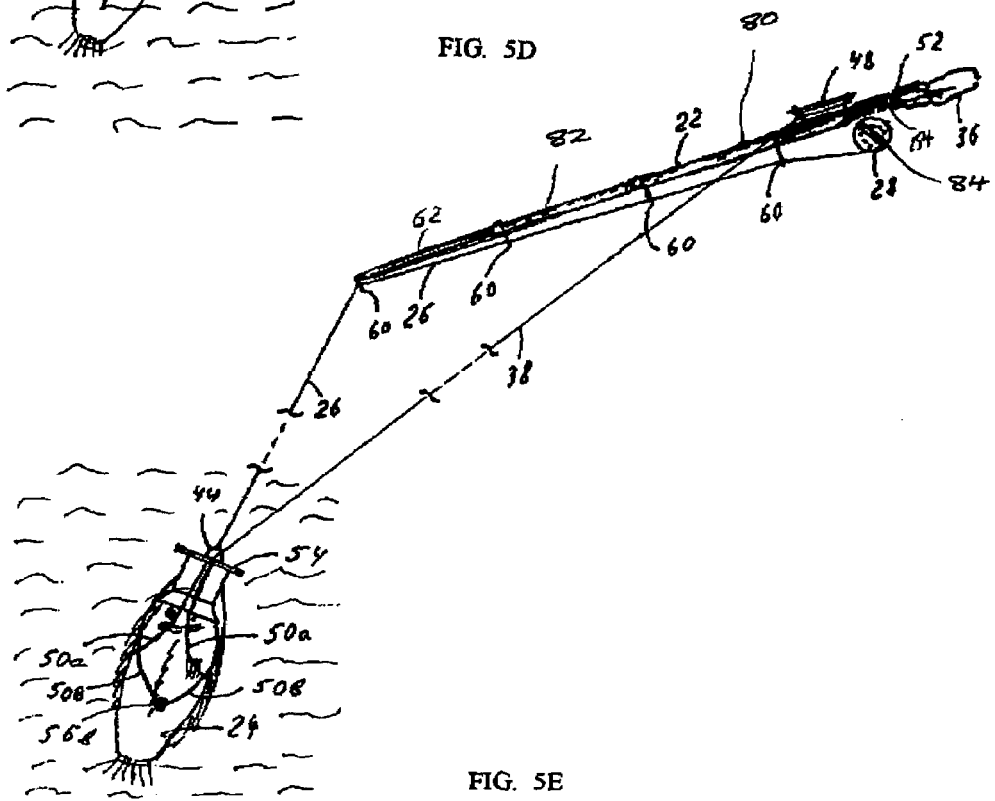

FIG. 4 shows how the fishing lasso apparatus lassos the caught fish. The lasso-keeper covers the caught fish's 24 head, then lassos 50a, 50b with heavy weight 56a, 56b slides over fish 24 down and lassos the fish 24 when the angler pulls the lasso up and lifts the fish 24.

FIGS. 5A to 5E shows the lasso apparatus to fishing rod 22 that is comprised of the keeper 54 with two lassos 50a and 50b and heavy weight 56a, 56b, and that has 54 a center hole-track 30 that slides over and around the fishing rod 22, fishing line 26, kill-devil 44, bobber 46 or other fishing line device. Then, lassos 50a, 50b with a heavy weight 56a, 56b slide over the caught fish 24 from head to tail, lasso the fish 24, because fish flippers, gills and flanks are entangled in the lasso(s) and hold caught fish 24 inside the lassos, when angler lifts a fish 24. A lasso apparatus to a fishing rod 22 comprises of an extra line 38 that connects, lassos 50a and 50b on the other side to a spinning or other extra line keeper 48 on a fishing rod 22. A lasso apparatus has clips or connectors 16 that can be joined to the lasso keeper 54 to fishing rod 22 by the angler in a fishing situation. Fishing line 26 must slide the keeper 54 into a central hole from an angler's spinning mechanism 42. A lasso keeper 54 can slide easily along the fishing rod 22 after the angler turns the fishing rod 22 one hundred eighty degrees, along fishing rod axis, to the position, when a fishing line track 60 under the rod 22 and then drops down its tip 22. See FIG. 5B

We claim:
1. A fishing rod-net combination, comprising:
an elongate fishing rod having a first end and a second end and in internal passage for fishing line;
a first spinning mechanism attached to the fishing rod proximate to the first end of the fishing rod;

fishing line attached to the first spinning mechanism and extending through the internal passage of the fishing rod and exiting at a second end of the fishing rod;

a fishing device such as a hook attached to an end of the fishing line opposite the end attached to the first spinning mechanism;

a soft tubing net positionable over a substantial length of the fishing rod, a first end of the soft tubing net positionable proximate to the first spinning mechanism, a second end of the soft tubing net positionable proximate the second end of the fishing rod, and at least one weight attached to the first end of the soft tubing net;

a net-keeper attached to the second end of the soft tubing net, the fishing line passing through the net-keeper, the net-keeper being positionable proximate to the second end of the fishing rod;

an extra line attached to the net-keeper and extending along an exterior of the fishing rod to an extra spinning mechanism located at the first end of the fishing rod;

the first end of the soft tubing net being extendable over the second end of the soft tubing net and the net-keeper, turning the soft tubing net inside out and extending the soft tubing net over the fishing line beyond the second end of the fishing rod;

the extra line being extendable by operation of the extra spinning mechanism to allow the net-keeper and soft tubing net to extend farther along the fishing line away from the second end of the fishing rod and over a fish engage by the fishing device at the end of the fishing line.

2. The fishing rod-net combination of claim 1 wherein the extra line is slide joined to the fishing line at a point beyond the second end of the fishing rod.

3. The fishing rod-net combination of claim 1 wherein the soft tubing net is in the form of an elongate tube.

4. The fishing rod-net combination of claim 1 wherein the extra spinning mechanism is incorporated into a handle at the first end of the fishing rod.

5. The fishing rod-net combination of claim 1 wherein the soft tubing net has one or more loops and one or more weights attached to one end of the one or more loops.

6. The fishing rod-net combination of claim 1 wherein the net-keeper has a central hole dimensioned to slide over the fishing rod, fishing devices and fishing line.

7. The net-keeper of claim 1 wherein the soft tubing net is flexible to allow changes in form, size and configuration for netting fish of different sizes.

* * * * *